(12) United States Patent  (10) Patent No.: US 7,587,626 B2
Terry et al.                (45) Date of Patent: Sep. 8, 2009

(54) INTELLIGENT HOTSPARE OR "SMARTSPARE" DRIVE WITH PRE-EMPTIVE DRIVE REBUILD

(75) Inventors: Jared Terry, Round Rock, TX (US); Dhiraj Sehgal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 551 days.

(21) Appl. No.: 11/012,962

(22) Filed: Dec. 15, 2004

(65) Prior Publication Data

US 2006/0149900 A1 Jul. 6, 2006

(51) Int. Cl.
G06F 11/00 (2006.01)
(52) U.S. Cl. .......................................... 714/6
(58) Field of Classification Search ................. 714/6–8, 714/11, 13, 15, 42
See application file for complete search history.

(56) References Cited

U.S. PATENT DOCUMENTS

| | | | |
|---|---|---|---|
| 5,546,535 A | 8/1996 | Stallmo et al. | 395/182.017 |
| 5,689,678 A | 11/1997 | Stallmo et al. | 395/441 |
| 5,720,025 A | 2/1998 | Wilkes et al. | 395/182.04 |
| 5,727,144 A * | 3/1998 | Brady et al. | 714/6 |
| 5,787,459 A | 7/1998 | Stallmo et al. | 711/112 |
| 5,790,773 A | 8/1998 | DeKoning et al. | 395/182.04 |
| 5,809,224 A | 9/1998 | Schultz et al. | 395/182.05 |
| 5,822,584 A | 10/1998 | Thompson et al. | 395/673 |
| 5,822,782 A | 10/1998 | Humlicek et al. | 711/170 |
| 5,881,311 A | 3/1999 | Woods | 395/822.4 |
| 5,961,652 A | 10/1999 | Thompson | 714/6 |
| 6,058,489 A | 5/2000 | Schultz et al. | 714/7 |
| 6,073,220 A * | 6/2000 | Gunderson | 711/162 |
| 6,076,142 A | 6/2000 | Corrington et al. | 711/114 |
| 6,112,255 A | 8/2000 | Dunn et al. | 710/7 |
| 6,175,904 B1 * | 1/2001 | Gunderson | 711/162 |
| 6,223,252 B1 * | 4/2001 | Bandera et al. | 711/114 |
| 6,289,398 B1 | 9/2001 | Stallmo et al. | 710/5 |
| 6,397,292 B1 | 5/2002 | Venkatesh et al. | 711/114 |
| 6,477,591 B1 * | 11/2002 | VanderSpek | 710/38 |
| 6,557,123 B1 | 4/2003 | Wiencko, Jr. et al. | 714/701 |
| 6,609,145 B1 | 8/2003 | Thompson et al. | 709/103 |
| 6,728,833 B2 | 4/2004 | Pruett et al. | 711/114 |
| 6,892,276 B2 * | 5/2005 | Chatterjee et al. | 711/114 |
| 6,952,794 B2 * | 10/2005 | Lu | 714/7 |
| 7,024,585 B2 * | 4/2006 | Chatterjee et al. | 714/7 |
| 7,139,931 B2 * | 11/2006 | Horn | 714/6 |
| 2003/0233611 A1 * | 12/2003 | Humlicek et al. | 714/763 |
| 2005/0102552 A1 * | 5/2005 | Horn | 714/6 |
| 2005/0257081 A1 * | 11/2005 | Schmitz | 714/5 |

* cited by examiner

Primary Examiner—Nadeem Iqbal
(74) Attorney, Agent, or Firm—Baker Botts L.L.P.

(57) ABSTRACT

An intelligent hotspare drive with pre-emptive drive rebuild is disclosed. In accordance with one embodiment of the present disclosure, a method for rebuilding a drive using an intelligent hotspare drive in an information handling system including detecting an error in a first drive in an information handling system such that the error indicates a possible drive failure. The method further includes automatically rebuilding the first drive with the detected problem using a second drive in the information handling system such that the second drive begins to mirror the first drive even though the first drive has not failed.

20 Claims, 3 Drawing Sheets

INTELLIGENT HOTSPARE OR "SMARTSPARE" DRIVE WITH PRE-EMPTIVE DRIVE REBUILD

TECHNICAL FIELD

The present disclosure relates generally to information handling systems and, more particularly, to an intelligent hotspare or "SmartSpare" drive with pre-emptive drive rebuild.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including computer systems, typically include storage disk drives and in some instances an array of disk drives. For example, an random array of independent disk (RAID) drives may be communicatively coupled to the information handling system for data storage and retrieval.

However, these disk drives are prone to faults and failures. As such, one or more of the disk may be configured as a hotspare drive. The hotspare drive operates as a replacement drive when a failure of a drive occurs. Thus, the hotspare generally sits idle until one of the drive physically fails which causes the hotspare to be rebuilt as a copy of the failed drive.

Unfortunately, rebuilds can take an enormous amount of time which costs valuable time to customers and factory production environments. Because the rebuild does not begin until the drive actually fails, the system typically has to devote several resources and processing time to rebuilding the drive under a standard rebuild algorithm. In addition to the time and resources consumed during a failed drive rebuild, the potential for loss of data or other information is greatly increased. This loss of data may be very great if the failed drive happens to be in a RAID 0 stripe set.

Smart trip errors or smart trips were developed in the industry as a tool to aid manufacturers in diagnosing problems within the drives. At present, manufacturers use these smart trips for diagnostic purposes. However, these diagnostics are not automatically acted upon by the system, but are only reported as a problem to the user and then ignored by the system leaving the reported problem for the user to repair.

SUMMARY

In accordance with one embodiment of the present disclosure, a method for rebuilding a drive using an intelligent hotspare drive in an information handling system including detecting an error in a first drive in an information handling system such that the error indicates a possible drive failure. The method further includes automatically rebuilding the first drive with the detected problem using a second drive in the information handling system such that the second drive begins to mirror the first drive even though the first drive has not failed.

In a further embodiment, an information handling system includes a processor coupled to a processor bus and a memory coupled to the processor bus. The memory communicatively coupled with the processor. The information handling system further comprising a first drive and a second drive operably connected to the processor and the memory, wherein the second drive operable to rebuild the first drive upon the detection of an error in the first drive such that the second drive begins to mirror the first drive even though the first drive has not failed.

In accordance with a further embodiment of the present disclosure, a computer-readable medium having computer-executable instructions for a method of rebuilding a drive using an intelligent hotspare drive in an information handling system including instructions for detecting an error in a first drive in an information handling system such that the error indicates a possible drive failure. The computer-readable medium further includes instructions for automatically rebuilding the first drive with the detected problem using a second drive in the information handling system such that the second drive begins to mirror the first drive even though the first drive has not failed.

One technical advantage of the present disclosure is the ability to have an "instant" rebuild of a failed drive. Because a problem drive can be pre-emptively rebuilt before the drive physically fails, the intelligent hotspare drive can become a mirror image of the problem drive. Thus, when the failure of the problem drive occurs, the hotspare drive can "instantly" take the place of the failed drive with minimal loss of performance to the system.

Another technical advantage of the present disclosure is the ability to mitigate performance degradation of the information handling system caused by a drive rebuild. Because the problem drive has not failed, the rebuild rate may be varied or set by a user. Thus, depending on the amount of system resources the user wishes to devote to the rebuild, the rebuild rate may be reduced to a slow rate such as ten percent of a normal rebuild algorithm.

A further technical advantage of the present disclosure is the ability to maintain the SmartSpare drive as a hotspare drive. Even though the SmartSpare drive may have been assigned or configured to rebuild a first drive, the SmartSpare drive may be re-assigned to rebuild another drive that physically fails. Thus, the SmartSpare drive may be considered to have a double redundancy which may further reduce the need to have multiple spares.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
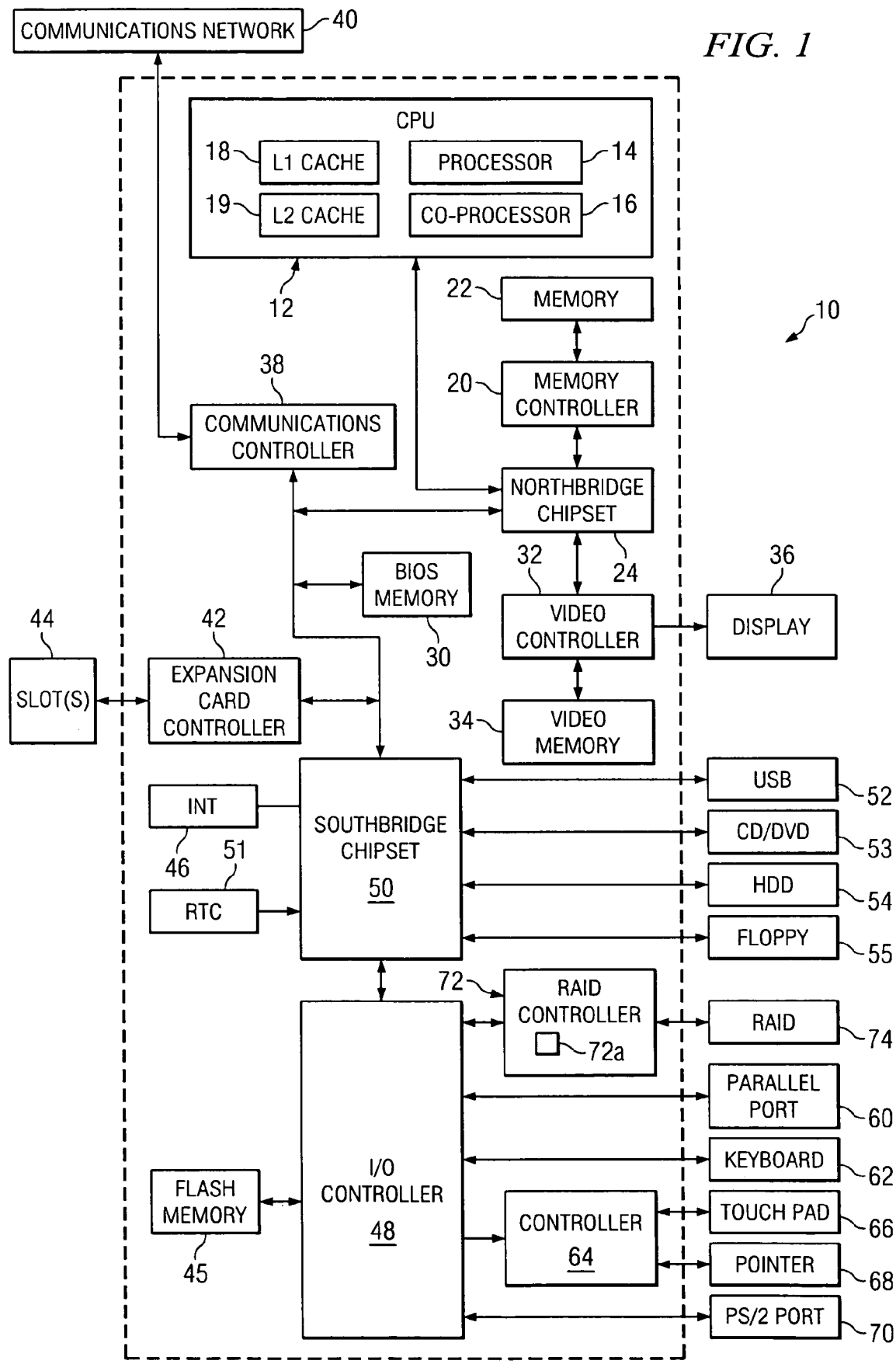
FIG. 1 is a block diagram showing an information handling system, according to teachings of the present disclosure.
Figure 2:
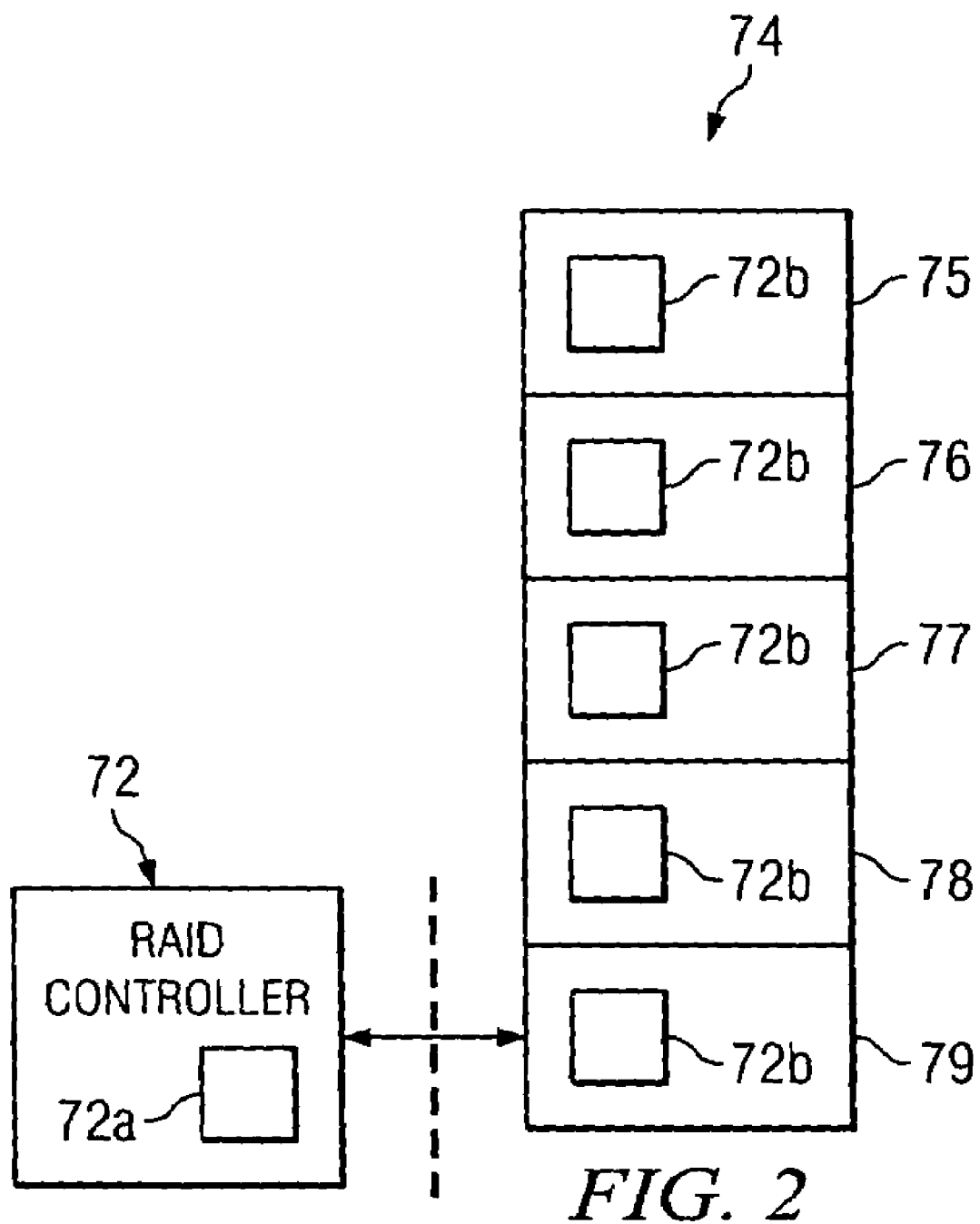
FIG. 2 illustrates an example embodiment of an array of storage drives in the information handling system, according to teachings of the present disclosure.
Figure 3:
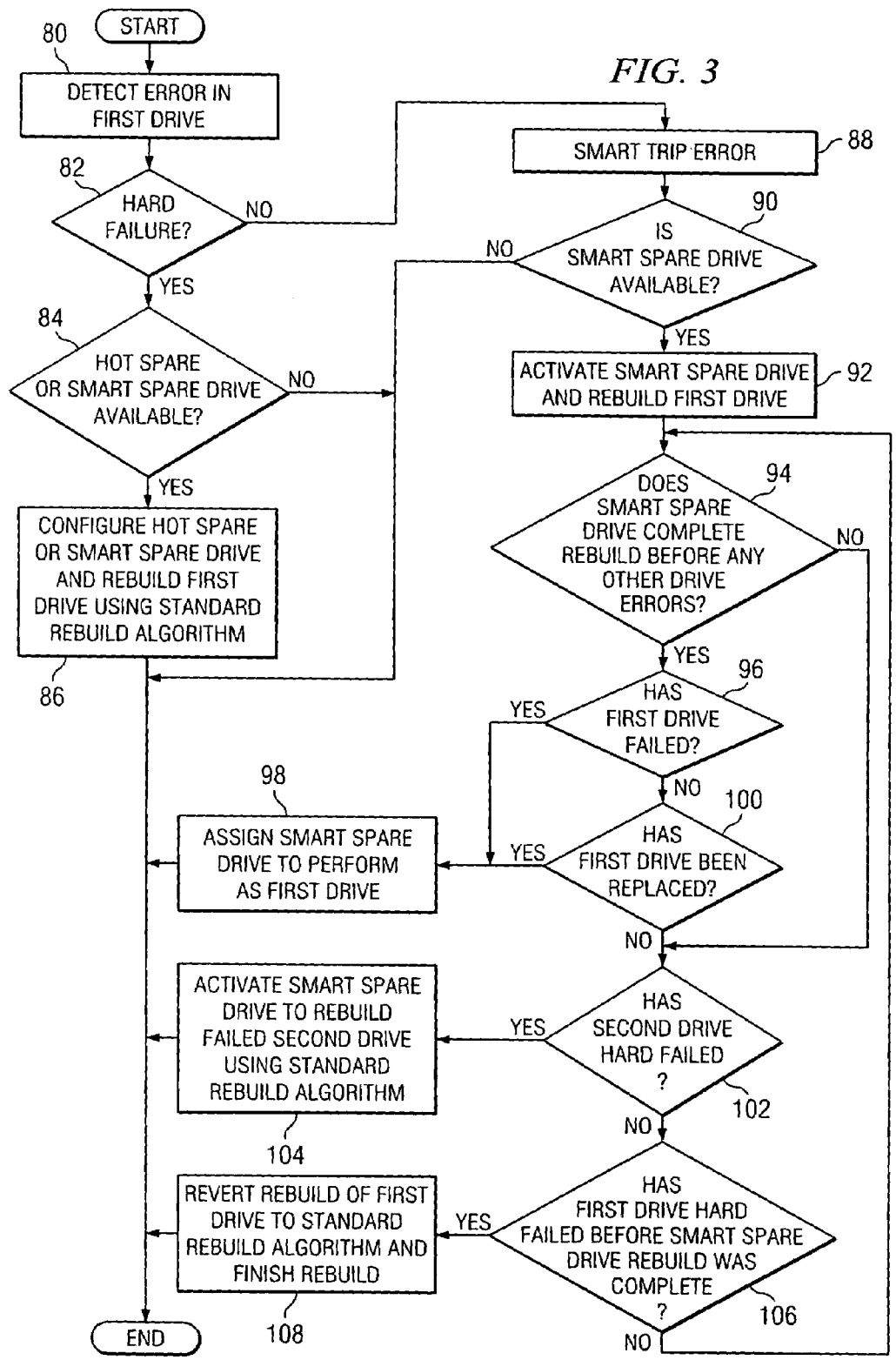
FIG. 3 is a flowchart for a method of rebuilding a drive using an intelligent hotspare or "SmartSpare" drive with pre-emptive smart error drive rebuild, according to teachings of the present disclosure.

Preferred embodiments and their advantages are best understood by reference to FIGS. 1 through 3, wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring first to FIG. 1, a block diagram of information handling system 10 is shown, according to teachings of the present disclosure. Information handling system 10 or computer system preferably includes one or more microprocessors such as central processing unit (CPU) 12. CPU 12 may include processor 14 for handling integer operations and coprocessor 16 for handling floating point operations. CPU 12 is preferably coupled to cache, such as L1 cache 18 and L2 cache 19 and a chipset, commonly referred to as Northbridge chipset 24, via a frontside bus 23. Northbridge chipset 24 preferably couples CPU 12 to memory 22 via memory controller 20. Main memory 22 of dynamic random access memory (DRAM) modules may be divided into one or more areas such as system management mode (SMM) memory area (not expressly shown).

Graphics controller 32 is preferably coupled to Northbridge chipset 24 and to video memory 34. Video memory 34 is preferably operable to store information to be displayed on one or more display panels 36. Display panel 36 may be an active matrix or passive matrix liquid crystal display (LCD), a cathode ray tube (CRT) display or other display technology. In selected applications, uses or instances, graphics controller 32 may also be coupled to an integrated display, such as in a portable information handling system implementation.

Northbridge chipset 24 serves as a "bridge" between CPU bus 23 and the connected buses. Generally, when going from one bus to another bus, a bridge is needed to provide the translation or redirection to the correct bus. Typically, each bus uses its own set of protocols or rules to define the transfer of data or information along the bus, commonly referred to as the bus architecture. To prevent communication problem from arising between buses, chipsets such as Northbridge chipset 24 and Southbridge chipset 50, are able to translate and coordinate the exchange of information between the various buses and/or devices that communicate through their respective bridge.

Basic input/output system (BIOS) memory 30 is also preferably coupled to PCI bus 25 connecting to Southbridge chipset 50. FLASH memory or other reprogrammable, nonvolatile memory may be used as BIOS memory 30. A BIOS program (not expressly shown) is typically stored in BIOS memory 30. The BIOS program preferably includes software which facilitates interaction with and between information handling system 10 devices such as a keyboard 62, a mouse such as touch pad 66 or pointer 68, or one or more I/O devices. BIOS memory 30 may also store system code (note expressly shown) operable to control a plurality of basic information handling system 10 operations.

Communication controller 38 is preferably provided and enables information handling system 10 to communicate with communication network 40, e.g., an Ethernet network. Communication network 40 may include a local area network (LAN), wide area network (WAN), Internet, Intranet, wireless broadband or the like. Communication controller 38 may be employed to form a network interface for communicating with other information handling systems (not expressly shown) coupled to communication network 40.

In certain information handling system embodiments, expansion card controller 42 may also be included and is preferably coupled to PCI bus 25 as shown. Expansion card controller 42 is preferably coupled to a plurality of information handling system expansion slots 44. Expansion slots 44 may be configured to receive one or more computer components such as an expansion card (e.g., modems, fax cards, communications cards, and other input/output (I/O) devices).

Southbridge chipset 50, also called bus interface controller or expansion bus controller preferably couples PCI bus 25 to an expansion bus. In one embodiment, expansion bus may be configured as an Industry Standard Architecture ("ISA") bus. Other buses, for example, a Peripheral Component Interconnect ("PCI") bus, may also be used.

Interrupt request generator 46 is also preferably coupled to Southbridge chipset 40. Interrupt request generator 46 is preferably operable to issue an interrupt service request over a predetermined interrupt request line in response to receipt of a request to issue interrupt instruction from CPU 12. Southbridge chipset 40 preferably interfaces to one or more universal serial bus (USB) ports 52, CD-ROM (compact disk-read only memory) or digital versatile disk (DVD) drive 53, an integrated drive electronics (IDE) hard drive device (HDD) 54 and/or a floppy disk drive (FDD) 55. In one example embodiment, Southbridge chipset 40 interfaces with HDD 54 via an IDE bus (not expressly shown). Other disk drive devices (not expressly shown) which may be interfaced to Southbridge chipset 40 include a removable hard drive, a zip drive, a CD-RW (compact disk—read/write) drive, and a CD-DVD (compact disk—digital versatile disk) drive.

Real-time clock (RTC) 51 may also be coupled to Southbridge chipset 50. Inclusion of RTC 51 permits timed events or alarms to be activated in the information handling system 10. Real-time clock 51 may be programmed to generate an alarm signal at a predetermined time as well as to perform other operations.

I/O controller 48, often referred to as a super I/O controller, is also preferably coupled to Southbridge chipset 50. I/O controller 48 preferably interfaces to one or more parallel port 60, keyboard 62, device controller 64 operable to drive and interface with touch pad 66 and/or pointer 68, and PS/2 Port 70. FLASH memory or other nonvolatile memory may be used with I/O controller 48.

Generally, chipsets 24 and 50 may further include decode registers to coordinate the transfer of information between CPU 12 and a respective data bus and/or device. Because the number of decode registers available to chipset 24 or 50 may be limited, chipset 24 and/or 50 may increase the number or I/O decode ranges using system management interrupts (SMI) traps.

Random array of independent disk (RAID) controller 72 generally interfaces between I/O controller 48 and RAID drive 74. Although RAID controller 72 is shown internal to information handling system 10, RAID controller may also be placed external to system 10 and couple to a regular drive controller to interface with I/O controller 48.

RAID 74 generally couples to information handing system 10 via an interface such as RAID controller 72. RAID 74 typically stores data for information handling system 10 using a category of disk drives that employ two or more drives in combination for fault tolerance and performance. In some embodiments, RAID controller 72 includes software or other computer-readable medium 72a that is operable to determine a disk drive error such as a smart trip and configure one of the disk drives to be an intelligent hotspare.

Referring to FIG. 2, RAID 74 preferably includes an array of disk drives such as RAID disk drives 75, 76, 77, 78 and 79. RAID disk drives 75, 76, 77, 78 and 79 are commonly used on servers but may be used with any information handling system 10. In some embodiments of the present disclosure, software or computer-readable medium 72a may be associated with each of the disk drives such as computer-readable medium 72b.

Typically, one or more of the RAID disk drives may be configured by RAID controller 72 as a spare drive or "hotspare" drive. Once configured, the hotspare drive may be able to rebuild a drive in RAID 74 that fails or may start to rebuild a drive that indicates a potential for failure. As such, RAID controller 72 includes intelligence for rebuilding the failing drive or drive with a reported error in a pre-emptive smart error rebuild, thereby creating an intelligent hotspare or "SmartSpare" drive.

In some embodiments, RAID 74 includes at least one drive configured as a "SmartSpare" drive such as RAID disk drive 79. Generally, the remaining disk drives, such as RAID disk drives 75, 76, 77 and 78, operate to store data for information handling system 10. In other embodiments, RAID controller 74 may configure more than one disk drive to function as a "SmartSpare" drive.

FIG. 3 is a flowchart for a method of rebuilding a drive using an intelligent hotspare with pre-emptive smart error drive rebuild, also known as a "SmartSpare" drive. In some embodiments, the method is stored on a computer-readable medium having computer-executable instructions for performing the method. For example, a computer program (not explicitly shown) may be stored on computer-readable medium 72a such that the program executes instructions for performing the method.

As shown at block 80, an error is detected in one of the drives in information handling system 10. For example, an error occurs in one of the drives which causes a smart trip error to be detected. Typically, the error is detected by a controller such as RAID controller 72.

Errors or smart trip errors in drives may occur for a variety of reasons such as potential loss of data. Typically, the error is stored so that the error can be reported to manufacturers for taking future preventative measures. However, based on the error, the controller determines whether to configure and enable the hotspare drive to become a SmartSpare drive such that a pre-emptive smart error drive rebuild occurs.

Once the error is detected, the method determines whether the error indicated a hard failure as shown in block 82. Generally, a hard failure error occurs when one of the drives in RAID 74 fails to the point of needing replacement.

If a hard failure has occurred, then the method proceeds to determine whether a hotspare or SmartSpare drive is available as shown at block 84. If no drive is available, the method ends because their is no spare drive able to rebuild the failed drive. However, if there is an available hotspare or SmartSpare drive, the method configures the drive and uses the drive to rebuild the failed drive using a standard rebuild algorithm as shown at block 86.

If, back at block 82, the error was not a hard failure error, a determination is made that the error was a smart trip error as shown at block 88. Based on the error being a smart trip error, the method determines whether a SmartSpare drive is available in information handling system 10, as shown at block 90. Generally, the SmartSpare drive is available if one of the drives has been enabled and configured to become the SmartSpare drive. However, if the SmartSpare drive has already been assigned or activated for mirroring a different drive, the activated SmartSpare drive will not be available for use. If the SmartSpare drive is determined to be unavailable, the method ends as no other drive is available as a hotspare.

If a SmartSpare drive is available, the method proceeds to activate the SmartSpare drive such that the drive begins to automatically rebuild the "problem drive" with the detected error even though the problem drive has not failed, as shown at block 92. The SmartSpare drive generally remains as a regular hotspare drive but also has a rebuild of the problem drive associated with the SmartSpare drive. The SmartSpare drive preferably creates a mirror copy of the problem drive after the rebuild is complete. As such, SmartSpare drive may use mirroring rules to create the mirror copy.

In some embodiments, the rate of rebuild SmartSpare drive is controlled by a user. In one example embodiment, a rebuild rate is set in the BIOS to control the rate of rebuilds of the SmartSpare drive. Controlling the rate of rebuilding allows the user to set the rebuild rate such that any performance degradation of information handling system 10 caused by the rebuild is mitigated. In one instance, a rate of rebuild is set in the system BIOS to a rate of ten percent of a common rebuild algorithm.

Following the activation and beginning of the rebuild, the method determines whether the SmartSpare drive completes the rebuild of the problem drive before any other drive errors as shown at block 94. Typically, the determination checks to see if another error has occurred such as a hard failure or a smart trip error before the problem drive has completed the rebuild.

If the problem drive has been rebuilt before the next drive error, the method determines whether the problem drive has failed as shown at block 96. If the problem drive has not failed, the SmartSpare drive continues to rebuild the drive such that the SmartSpare will eventually mirror the problem drive. The SmartSpare typically continues to mirror the problem drive unless another drive has a failure or the problem drive actually fails whereby the SmartSpare drive takes the place of the failed drive.

If the problem drive has failed, the method assigns the SmartSpare drive to perform as the failed drive, as shown at block 98. Because the rebuild of the problem drive had already finished or completed such that the SmartSpare drive mirrors the problem drive, the rebuilt drive may be assigned to perform as the new drive. Thus in this instance, the method would have preemptively rebuilt the failing problem drive prior to the drive actually failing allowing a mirrored copy of the drive to be created prior to any potential loss of data.

If, at block 96, the problem drive has not failed, the method determines whether the problem drive has been replaced. Because the SmartSpare drive mirrors the problem drive, a user may optionally elect to replace the problem drive before the drive physically fails as shown at block 100. If the problem drive is replaced, the method proceeds to assign the SmartSpare drive to perform as the removed problem drive.

For example, a user may remove the problem drive which may automatically causes the SmartSpare drive to take over for the removed drive as shown at block 98. In some instances, the user may install a new drive in place of the problem drive. As such, the new drive, which replaced the problem drive, may be configured to become a hotspare or SmartSpare drive.

If, back at block 94, the rebuild of the problem drive was not complete before another drive error or if the first drive was not replace, back at block 100, the method determines whether another drive such as a second drive has failed as shown at block 102. At this point, the method has determined that the rebuild of the problem drive is not complete and that an error has occurred in a second drive. If the error is determined to be a hard failure of the second drive, the method activates the SmartSpare drive to rebuild the failed second drive using a standard rebuild algorithm as shown at block 104. Generally, the rebuilding of the second drive will preempt the rebuild of the problem drive is another hotspare or SmartSpare drive is unavailable. As such, the SmartSpare drive typically is redirected to rebuild the failed second drive in lieu of the problem drive.

If, at block 102, the second drive did not have a hard failure, the method determines whether the problem drive has had a hard failure before the SmartSpare drive rebuild was complete as shown at block 106. If the problem drive did not have a hard failure, the method returns to determine whether the SmartSpare drives completes the rebuild of the problem drive before any other drive errors as shown at block 94.

If the problem drive did fail before the rebuild was complete, the method reverts to a rebuild of the problem drive using a standard rebuild algorithm such that the failed drive is rebuild using a standard algorithm as shown at block 108. In some instances, the rebuilding of the problem drive continues from the point where a slow rebuild had stopped and finishes the rebuild of the failed drive using a standard rebuild algorithm.

Although the disclosed embodiments have been described in detail, it should be understood that various changes, substitutions and alterations can be made to the embodiments without departing from their spirit and scope.

What is claimed is:

1. A method of rebuilding a drive using an intelligent hotspare drive in an information handling system, comprising:

detecting an error in a first drive in an information handling system such that the error indicates a possible drive failure; and in response to the detection of the error, automatically rebuilding the first drive with the detected error using a second drive in the information handling system such that the second drive begins to mirror the first drive even though the first drive has not failed.

2. The method of claim 1, wherein detecting the error further comprising detecting a smart trip error by a controller.

3. The method of claim 1, further comprising setting the rate of rebuild for the second drive.

4. The method of claim 3, wherein the rate of rebuild further comprises a slow rebuild rate such that any performance degradation of the information handling system caused by the rebuild is mitigated.

5. The method of claim 1, further comprising redirecting the second drive to rebuild a third drive instead of the first drive based on an actual failure of the third drive.

6. The method of claim 1, further comprising:

detecting a failure of the first drive;

based on the rebuild not being complete, automatically rebuilding the second drive according to a standard rebuild algorithm; and based on the rebuild being complete, automatically assigning the second drive to perform as the first drive.

7. The method of claim 1, further comprising:

based on the rebuild of the first drive, removing the first drive from the information handling system prior to failure of the first drive; and assigning the second drive to perform as the first drive.

8. The method of claim 7, further comprising replacing the first drive with a new drive such that the new drive becomes a hotspare drive.

9. An information handling system, comprising:

a processor coupled to a processor bus;

a memory coupled to the processor bus, the memory communicatively coupled with the processor;

a first drive and a second drive operably connected to the processor and the memory;

wherein the second drive operable to rebuild the first drive upon the detection of an error in the first drive such that the second drive begins to mirror the first drive even though the first drive has not failed.

10. The information handling system of claim 9, wherein the first and second drive form a part of an array of drives in the information handling system.

11. The information handling system of claim 10, wherein the array of drives comprises a redundant array of independent disk (RAID) drive.

12. The information handling system of claim 9, further comprising a basic input/output (I/O) system (BIOS) operably coupled to the processor and memory, the BIOS operable to control the rebuild rate of the second drive.

13. The information handling system of claim 12, wherein the rebuild rate comprises a rate of ten percent of a common rebuild algorithm.

14. The information handling system of claim 9, further comprising a controller to detect the error.

15. A computer-readable storage medium having computer-executable instructions for performing a method of rebuilding a drive using an intelligent hotspare drive in an information handling system, comprising:

instructions for detecting an error in a first drive in an information handling system such that the error indicates a possible drive failure; and instructions for automatically rebuilding, in response to the detection of the error, the first drive with the detected error using a second drive in the information handling system such that the second drive begins to mirror the first drive even though the first drive has not failed.

16. The computer-readable storage medium of claim 15, further comprising instructions for setting the rate of rebuild for the second drive.

17. The computer-readable storage medium of claim 16, further comprising redirecting the second drive to rebuild a third drive instead of the first drive based on an actual failure of the third drive.

18. The computer-readable storage medium of claim 15, further comprising:
   instructions for detecting a failure of the first drive;
   instructions for automatically rebuilding the second drive according to a standard rebuild algorithm based on the rebuild not being complete; and
   instructions for automatically assigning the second drive to perform as the first drive based on the rebuild being complete.

19. The computer-readable storage medium of claim 15, further comprising:
   instructions for removing the first drive from the information handling system prior to failure of the first drive based on the rebuild of the first drive; and
   instructions for assigning the second drive to perform as the first drive.

20. The computer-readable storage medium of claim 15, further comprising instructions for configuring a new drive that replaced the first drive to perform as an intelligent hotspare drive.

* * * * *

UNITED STATES PATENT AND TRADEMARK OFFICE
CERTIFICATE OF CORRECTION

PATENT NO. : 7,587,626 B2 Page 1 of 1
APPLICATION NO. : 11/012962
DATED : September 8, 2009
INVENTOR(S) : Terry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 702 days.

Signed and Sealed this

Twenty-first Day of September, 2010

David J. Kappos
*Director of the United States Patent and Trademark Office*